(12) United States Patent
Roth

(10) Patent No.: US 6,179,145 B1
(45) Date of Patent: Jan. 30, 2001

(54) SERVICEABLE SEALED FUEL TANK

(75) Inventor: Robert A. Roth, Grand Blanc, MI (US)

(73) Assignee: Delphi Technologies, INC, Troy, MI (US)

( * ) Notice: Under 35 U.S.C. 154(b), the term of this patent shall be extended for 0 days.

(21) Appl. No.: 09/467,222

(22) Filed: Dec. 20, 1999

(51) Int. Cl.$^7$ .................................................. B65D 19/00
(52) U.S. Cl. ...................... 220/4.14; 220/4.13; 220/4.21
(58) Field of Search ............................ 220/4.12, 4.13, 220/4.14, 4.21, 86.2

(56) References Cited

U.S. PATENT DOCUMENTS

| | | | |
|---|---|---|---|
| 4,159,781 | * | 7/1979 | Bartlow et al. ...................... 220/4.13 |
| 4,759,459 | * | 7/1988 | Bailey et al. ................... 220/4.14 X |
| 5,544,777 | * | 8/1996 | Watson ................................ 220/4.13 |
| 5,547,096 | * | 8/1996 | Kleyn .................................. 220/4.14 |
| 5,850,933 | * | 12/1998 | Pazik ............................... 220/4.14 X |

FOREIGN PATENT DOCUMENTS 0799738   2/1997   (EP) .

* cited by examiner

Primary Examiner—Steven Pollard
(74) Attorney, Agent, or Firm—Vincent A. Cichosz

(57) ABSTRACT

A serviceable sealed fuel tank includes a tank shell having a first half shell and a second half shell connected to the first half shell. The serviceable sealed fuel tank also includes at least one internal component disposed inside the tank shell between the first half shell and the second half shell. The serviceable sealed fuel tank further includes an inspection tower extending outwardly from the second half shell and being sealed. A portion of the inspection tower is removed to allow access to the at least one component after the first half shell and the second half shell are connected together.

20 Claims, 3 Drawing Sheets

SERVICEABLE SEALED FUEL TANK

TECHNICAL FIELD

The present invention relates generally to fuel tanks for vehicles and, more particularly, to a serviceable sealed fuel tank for a vehicle.

BACKGROUND OF THE INVENTION

It is known to provide a fuel tank such as a plastic fuel tank in a vehicle to hold fuel to be used by an engine of the vehicle. Typically, the fuel tank has a shell with a tank opening and a unit installed into the tank via the tank opening. The fuel tank also has a cover to close the tank opening.

It is desirable to form a serviceable sealed fuel tank for a vehicle that is formed using a thermoforming process and eliminating a tank opening for the fuel tank. It is also desirable to provide a sealed fuel tank that allows a fuel tank opening to be eliminated. It is further desirable to provide a sealed fuel tank that reduces cost and labor required to assemble a cover to the fuel tank. It is further desirable to provide a sealing cover for a fuel tank, which can be attached to the fuel tank at the time of service.

SUMMARY OF THE INVENTION

It is, therefore, one object of the present invention to provide a serviceable sealed fuel tank for a vehicle.

It is another object of the present invention to provide a sealed fuel tank with a sealed service port that can be opened to allow servicing of internal components.

It is yet another object of the present invention to provide a sealing cover that can be attached to a fuel tank at the time of service.

To achieve the foregoing objects, the present invention is a serviceable sealed fuel tank including a tank shell having a first half shell and a second half shell connected to the first half shell. The serviceable sealed fuel tank also includes at least one internal component disposed inside the tank shell between the first half shell and the second half shell. The serviceable sealed fuel tank further includes an inspection tower extending outwardly from the second half shell and being sealed. A portion of the inspection tower is removed to allow access to the at least one component after the first half shell and the second half shell are connected together.

One advantage of the present invention is that a new serviceable sealed fuel tank is provided for a vehicle. Another advantage of the present invention is that the serviceable sealed fuel tank has two halves joined by a thermoforming process and allows for internal components to be disposed and assembled into the fuel tank before the two halves are joined. Yet another advantage of the present invention is that the serviceable sealed fuel tank allows a sealed service port to be molded into the fuel tank, which can then be opened by service technicians if servicing of the internal components becomes necessary. Still another advantage of the present invention is that the serviceable sealed fuel tank can be manufactured without a component installation tank opening or cover, which saves money and labor and improves tank reliability from a leakage/vapor emissions standpoint. A further advantage of the present invention is that the serviceable sealed fuel tank allows a sealing cover to be created which can be attached to the fuel tank at the time of service. Yet a further advantage of the present invention is that the serviceable sealed fuel tank has less components, less labor, less cost and a more robust fuel tank with components sealed within the fuel tank during assembly and an inspection tower opened only if the fuel tank requires service. Still a further advantage of the present invention is that the serviceable sealed fuel tank eliminates tank openings, improves tank assembly reliability, and reduces scrap by eliminating a leak path for fuel or fuel vapors. Another advantage of the present invention is that the serviceable sealed fuel tank reduces cost of fuel tank assembly by eliminating labor required to assemble a cover to the fuel tank and by making any cover as an after-market service item.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
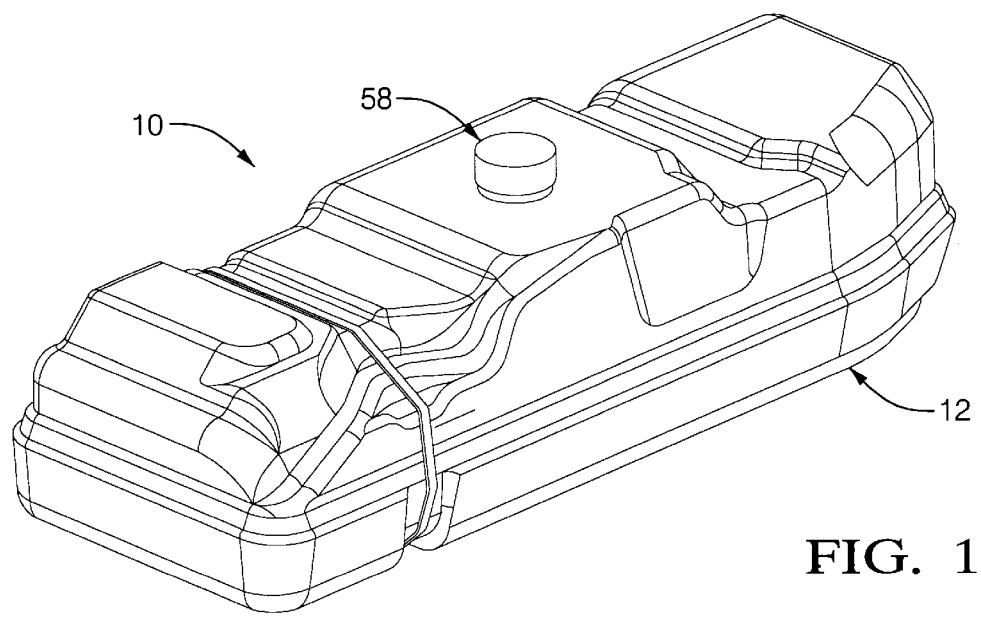
FIG. 1 is a perspective view of a serviceable sealed fuel tank, according to the present invention.
Figure 2:
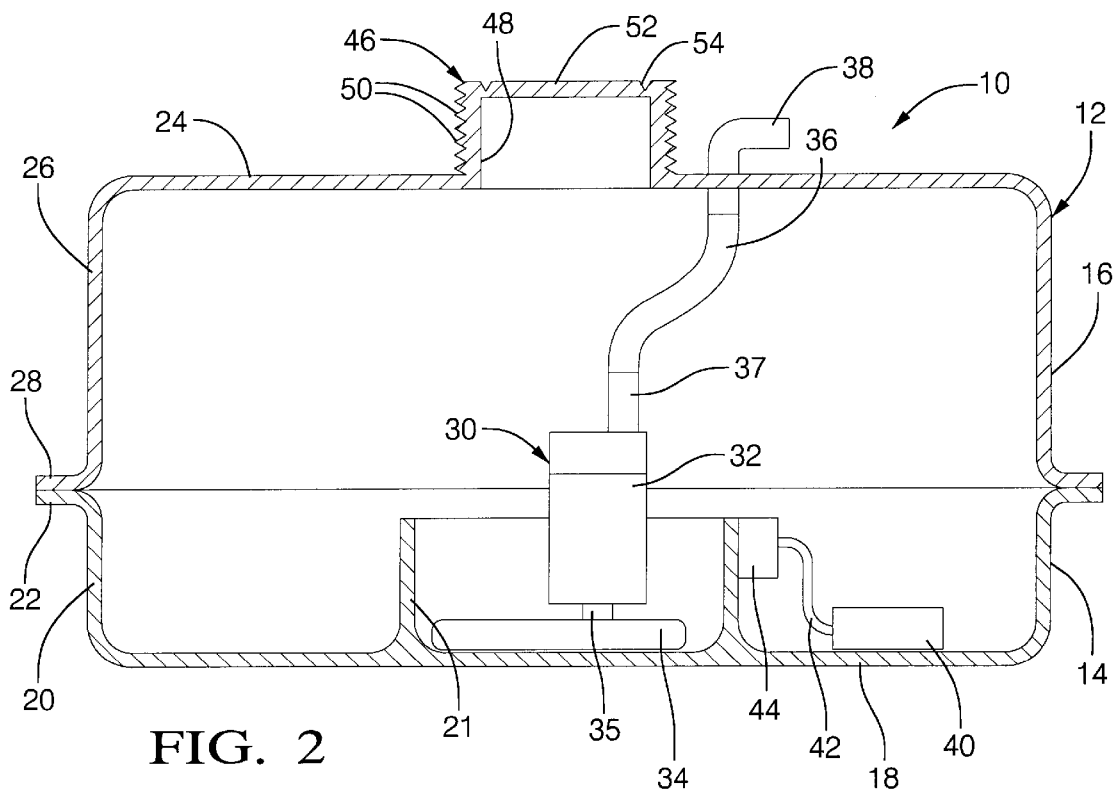
FIG. 2, is an enlarged fragmentary elevational view of the serviceable sealed fuel tank of FIG. 1.

Referring to the drawings and in particular FIGS. 1 and 2, one embodiment of a serviceable sealed fuel tank 10, according to the present invention, is shown for a vehicle (not shown). The serviceable sealed fuel tank 10 includes a tank shell, generally indicated at 12. In this embodiment, the tank shell 12 includes a first or lower half shell 14 and a second or upper half shell 16. The lower half shell 14 has a base wall 18 and a side wall 20 around a periphery of the base wall 18 and extending generally perpendicular thereto. The base wall 18 may have an interior wall 21 extending generally perpendicular thereto to form a fuel reservoir. The interior wall 21 is annular. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together by suitable means such as by welding. The lower half shell 14 and upper half shell 16 are made of a rigid material such as plastic. The tank shell 12 is made by a thermoforming process that is conventional and known in the art.

The serviceable sealed fuel tank 10 includes at least one, preferably a plurality of internal components, generally indicated at 30, disposed in the tank shell 12. In the embodiment illustrated, one of the component 30 is a fuel pump 32 disposed partially in the fuel reservoir and a fuel strainer 34 connected to an inlet 35 of the fuel pump 32. The components 30 may include a conduit 36 connected to an outlet 37 of the fuel pump 32 and to a connector 38 extending through the base wall 24 of the upper half shell 16.

The components 30 may include a float 40 connected by an arm 42 to a fuel level 44 to indicate a level of fuel in the tank shell 12. It should be appreciated that the components 30 may also include a jet pump, vent valve, drain line, fuel limiting vent valve, canister bed or the like (not shown).

The serviceable sealed fuel tank 10 further includes a service or inspection tower, generally indicated at 46, extending from the tank shell 12. The tower 46 includes a side wall 48 extending outwardly and generally perpendicular to the top wall 24 of the upper half shell 16. The tower 46 has a generally cylindrical shape with a generally circular cross-sectional shape. The side wall 48 may include a plurality of external threads 50 for a function to be described. The tower 46 has a top wall 52 closing an upper end of the side wall 48. The top wall 52 is generally planar and circular in shape. The tower 46 may include a notch or groove 54 extending inwardly into the top wall 52 adjacent the side wall 48. The notch 54 is generally annular and V shaped to allow the top wall 52 to be removed for service or inspection of the interior of the tank shell 12. The tower 46 is formed of a plastic material, preferably the same material as the tank shell 12, and molded to the upper half shell 16.

Figure 3:
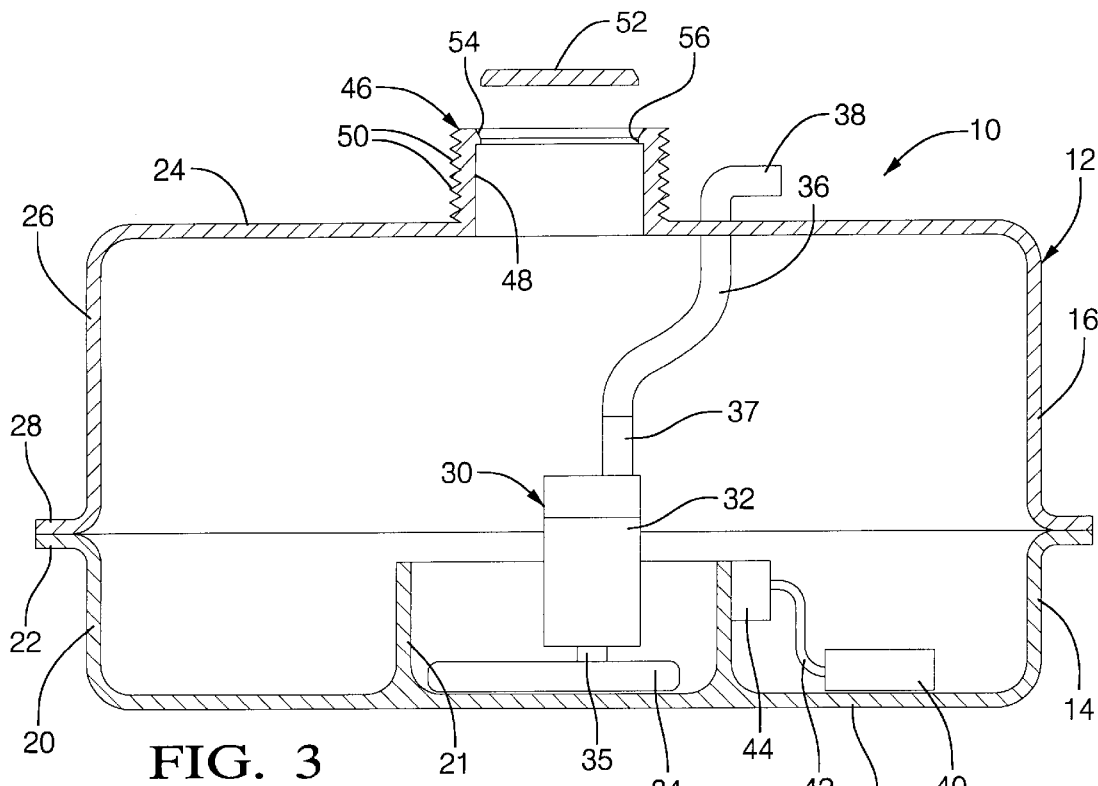
FIG. 3 is a view similar to FIG. 2 illustrating a portion removed.

In operation, the serviceable sealed fuel tank 10 has the half shells 14 and 16 of the tank shell formed by the thermoforming process. The internal components 30 are then disposed between the half shells 14 and 16. The flanges 22 and 28 are then welded shut. The serviceable sealed fuel tank 10 is illustrated in an assembled state in FIG. 2. When initially fabricated, the tower 46 is molded shut with the top wall 52. If repair work is required on the components 30 disposed in the tank shell 12, the top wall 52 is cut open, preferably along the notch 54, and removed to form an opening 56 that communicates with the interior of the tank shell 12 as illustrated in FIG. 3. It should be appreciated that service is performed with access to the components 30 through the opening 56 of the tower 46.

Figure 4:
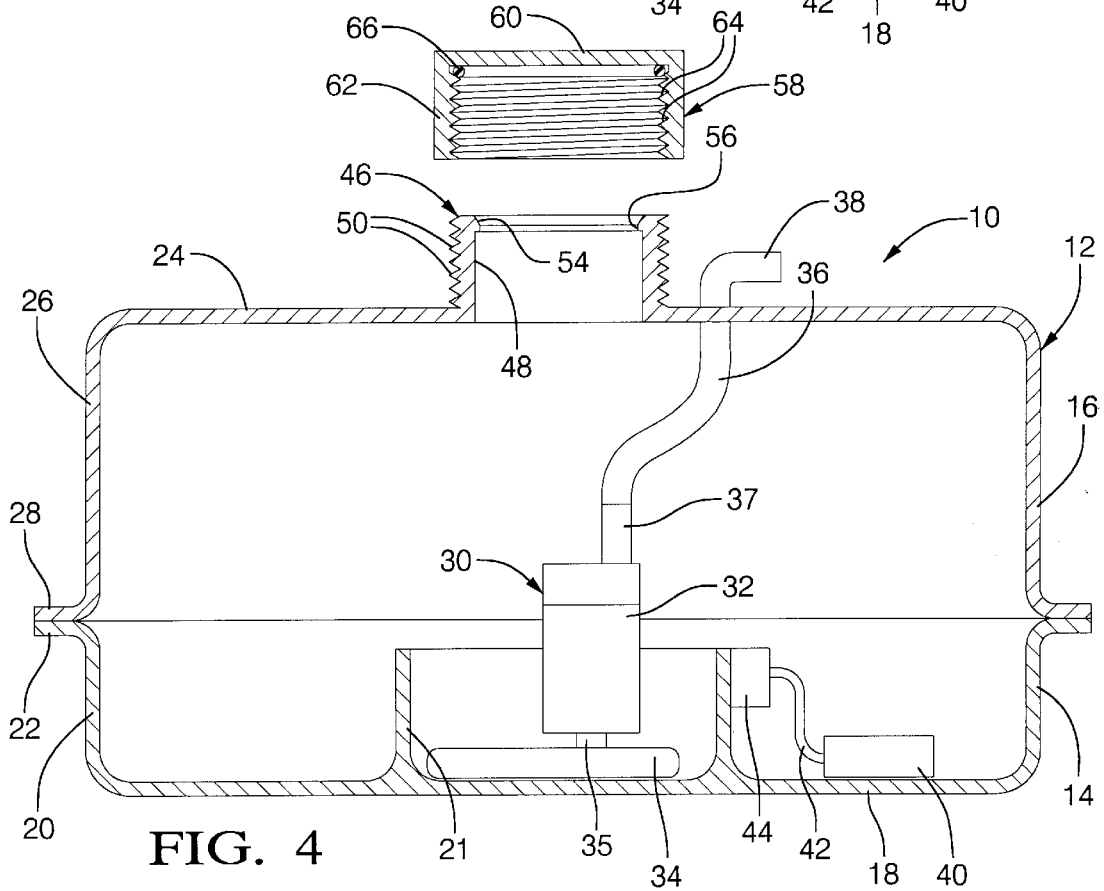
FIG. 4 is a view similar to FIG. 2 illustrating a sealing cover for attachment to the serviceable sealed fuel tank after the portion is removed.

As illustrated in FIG. 4, the serviceable sealed fuel tank 10 may include a sealing cover, generally indicated at 58, to close or seal the opening 56 of the tower 46. The cover 58 includes a generally planar base wall 60 and a side wall 62 extending outwardly and generally perpendicular to the base wall 60. The cover 58 has a generally cylindrical shape with a generally circular cross-sectional shape. The side wall 62 may include a plurality of internal threads 64 for threaded engagement with the external threads 50 on the tower 46. The cover 58 may include a seal 66 disposed between the base wall 60 and threads 64. The seal 66 is generally a circular ring and is made of a flexible material such as an elastomer. Except for the seal 66, the cover 58 is made of a rigid material such as plastic and is a monolithic structure being integral, unitary and formed as one-piece.

Figure 5:
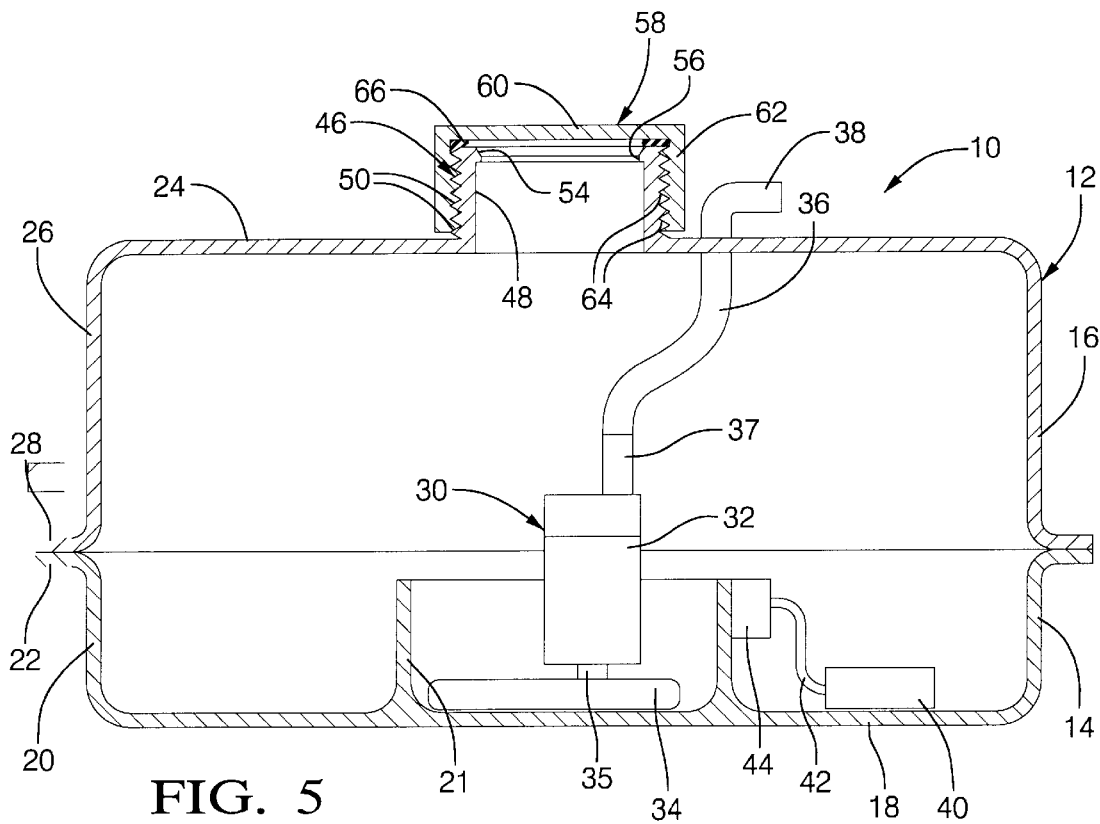
FIG. 5 is a view similar to FIG. 4 illustrating the sealing cover attached to the serviceable sealed fuel tank.

In operation, upon completion of the service to the components 30, the opening 56 is closed and sealed with the cover 58 by threaded engagement between the threads 64 on the cover 58 and the threads 50 on the tower 46 as illustrated in FIG. 5. It should be appreciated that the cover 58 is supplied as a service component to be removably attached to the tower 46 after the top wall 52 is removed. It should also be appreciated that the tower 46 eliminates the tank opening, thereby greatly reducing the amount of vapor and fuel tank vapor permeation that can escape from the tank shell 12 prior to opening of the tower 46.

Alternatively, the serviceable sealed fuel tank 10 may eliminate the threads 50 on the tower 46 and form the side wall 48 with a smooth outer surface. In this embodiment, the cover 58 includes the threads 64 being self-tapping threads that are threaded onto the smooth outer surface of the side wall 48 of the tower 46. The cover 58 remains in place and is preferably not removed.

Figure 6:
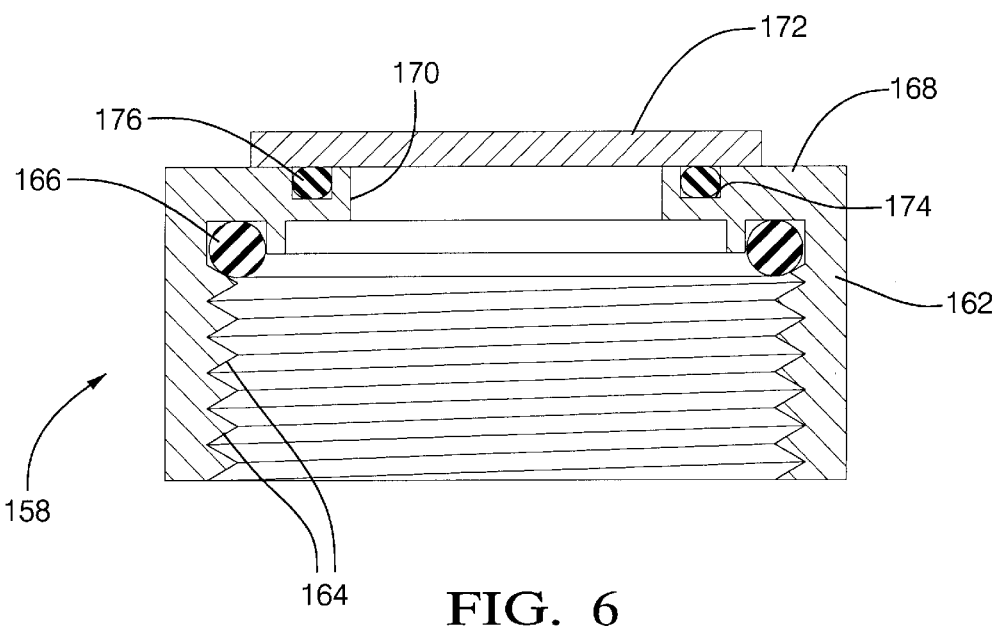
FIG. 6 is another embodiment, according to the present invention, of the sealing cover of FIGS. 4 and 5.

Referring to FIG. 6, another embodiment 158, according to the present invention, of the cover 58 is shown. Like parts of the cover 58 have like reference numerals increased by one hundred (100). In this embodiment, the cover 158 may have an opening 170 in the base wall 160. The opening 170 is generally circular in shape, but may be any suitable shape. The cover 158 includes a cover plate 172 disposed adjacent the base wall 160 to close and seal the opening 170. The cover plate 172 is generally circular in shape and made of a rigid material. The vapor cover 158 may include an annular groove 174 extending into the base wall 160 adjacent the opening 170 and a seal 176 disposed in the groove 174. The seal 176 is similar to the seal 166. In this embodiment, the threads 164 are self-tapping threads that are threaded onto the smooth outer surface of the side wall 48 of the tower 46. The cover 58 is installed one time and remains in place. It should be appreciated that the cover plate 172 is removed for all servicing of the components 30 disposed in the tank shell 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A serviceable sealed fuel tank comprising:
    a tank shell having a first half shell and a second half shell connected to said first half shell;
    at least one internal component disposed inside said tank shell between said first half shell and said second half shell; and
    an inspection tower extending outwardly from said second half shell and being sealed, wherein a portion of said inspection tower is removed to allow access to said at least one component after said first half shell and said second half shell are connected together.

2. A serviceable sealed fuel tank as set forth in claim 1 wherein said inspection tower comprises a side wall extending upwardly and generally perpendicular to said second half shell.

3. A serviceable sealed fuel tank as set forth in claim 2 wherein said inspection tower further comprises a top wall extending generally perpendicular to said side wall and sealing said inspection tower.

4. A serviceable sealed fuel tank as set forth in claim 3 wherein said portion is removed from said top wall to form an opening therein.

5. A serviceable sealed fuel tank as set forth in claim 4 including a sealing cover to cover and seal said opening.

6. A serviceable sealed fuel tank as set forth in claim 5 wherein said sealing cover comprises a base wall and a side wall extending from said base wall.

7. A serviceable sealed fuel tank as set forth in claim 6 wherein said side wall includes a plurality of internal threads.

8. A serviceable sealed fuel tank as set forth in claim 7 wherein said internal threads are self-tapping.

9. A serviceable sealed fuel tank as set forth in claim 7 wherein said sealing cover includes a seal disposed between said base wall and said internal threads.

10. A serviceable sealed fuel tank as set forth in claim 6 wherein said base wall includes an opening extending therethrough and a cover plate disposed adjacent said opening.

11. A serviceable sealed fuel tank as set forth in claim 1 wherein said inspection tower is a monolithic structure being integral, unitary and one-piece.

12. A serviceable sealed fuel tank for a vehicle comprising:
- a tank shell having a first half shell and a second half shell connected to said first half shell;
- at least one internal component disposed inside said tank shell between said first half shell and said second half shell; and
- an inspection tower comprising a side wall extending upwardly and generally perpendicular to said second half shell and a top wall extending generally perpendicular to said side wall and sealing said inspection tower, wherein a portion of said top wall is removed to form an opening to allow access to said at least one component after said first half shell and said second half shell are connected together.

13. A serviceable sealed fuel tank as set forth in claim 12 including a sealing cover to cover and seal said opening.

14. A serviceable sealed fuel tank as set forth in claim 13 wherein said sealing cover comprises a base wall and a side wall extending from said base wall.

15. A serviceable sealed fuel tank as set forth in claim 14 wherein said side wall of said inspection tower has a plurality of external threads and said side wall of said sealing cover includes a plurality of internal threads for threaded engagement with said external threads.

16. A serviceable sealed fuel tank as set forth in claim 14 wherein said side wall of said inspection tower has a smooth outer surface.

17. A serviceable sealed fuel tank as set forth in claim 14 wherein said sealing cover includes a seal disposed adjacent said base wall.

18. A serviceable sealed fuel tank as set forth in claim 13 wherein said side wall of said sealing cover includes a plurality of internal threads being self-tapping to engage said outer surface.

19. A serviceable sealed fuel tank as set forth in claim 18 wherein said base wall includes an opening extending therethrough and a cover plate disposed adjacent said opening.

20. A serviceable sealed fuel tank for a vehicle comprising:
- a tank shell having a first half shell and a second half shell connected to said first half shell;
- at least one internal component disposed inside said tank shell between said first half shell and said second half shell; and
- an inspection tower comprising a side wall extending upwardly and generally perpendicular to said second half shell and a top wall extending generally perpendicular to said side wall and sealing said inspection tower, wherein a portion of said top wall is removed to form an opening to allow access to said at least one component after said first half shell and said second half shell are connected together; and
- a sealing cover to cover and seal said opening.

* * * * *